April 26, 1955

J. H. HOERN 2,707,026

WIRE CUTTING MACHINES

Filed July 17, 1951

INVENTOR.
JOSEPH H. HOERN
BY Hudson, Boughton,
Williams, David & Hoffmann.
ATTORNEYS April 26, 1955

J. H. HOERN 2,707,026

WIRE CUTTING MACHINES

Filed July 17, 1951

INVENTOR.
JOSEPH H. HOERN
BY Hudson, Doughton,
Williams, David & Hoffmann
ATTORNEYS April 26, 1955   J. H. HOERN   2,707,026
WIRE CUTTING MACHINES
Filed July 17, 1951
5 Sheets—Sheet 3

INVENTOR.
JOSEPH H. HOERN
BY Hudson, Boughton,
Williams, David & Hoffmann
ATTORNEYS

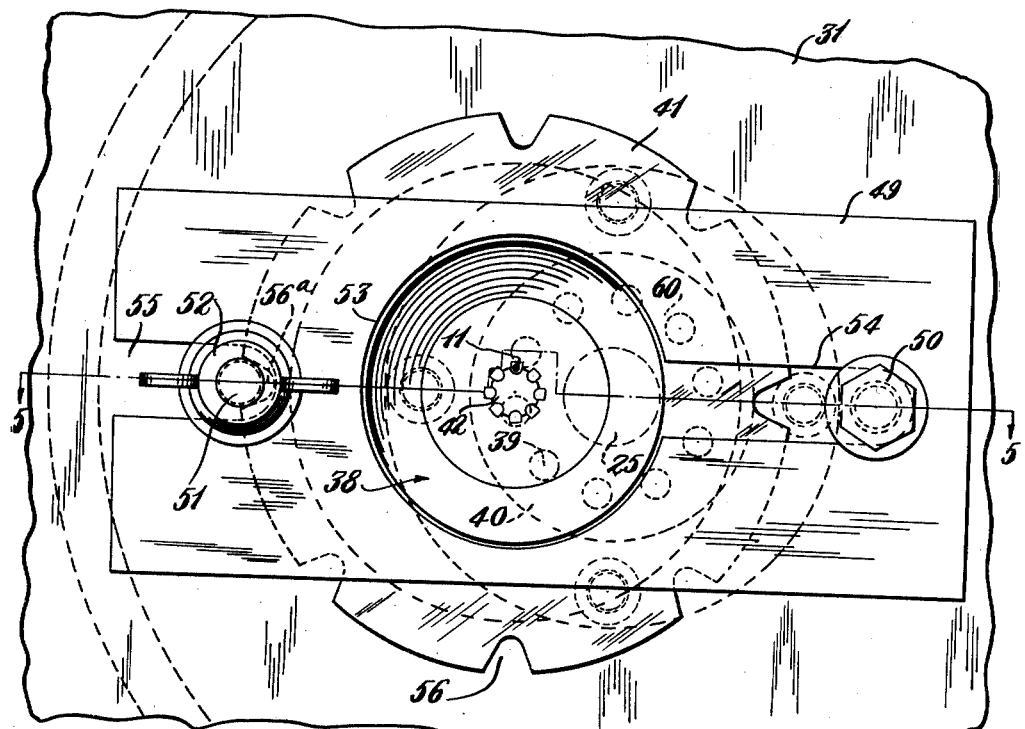

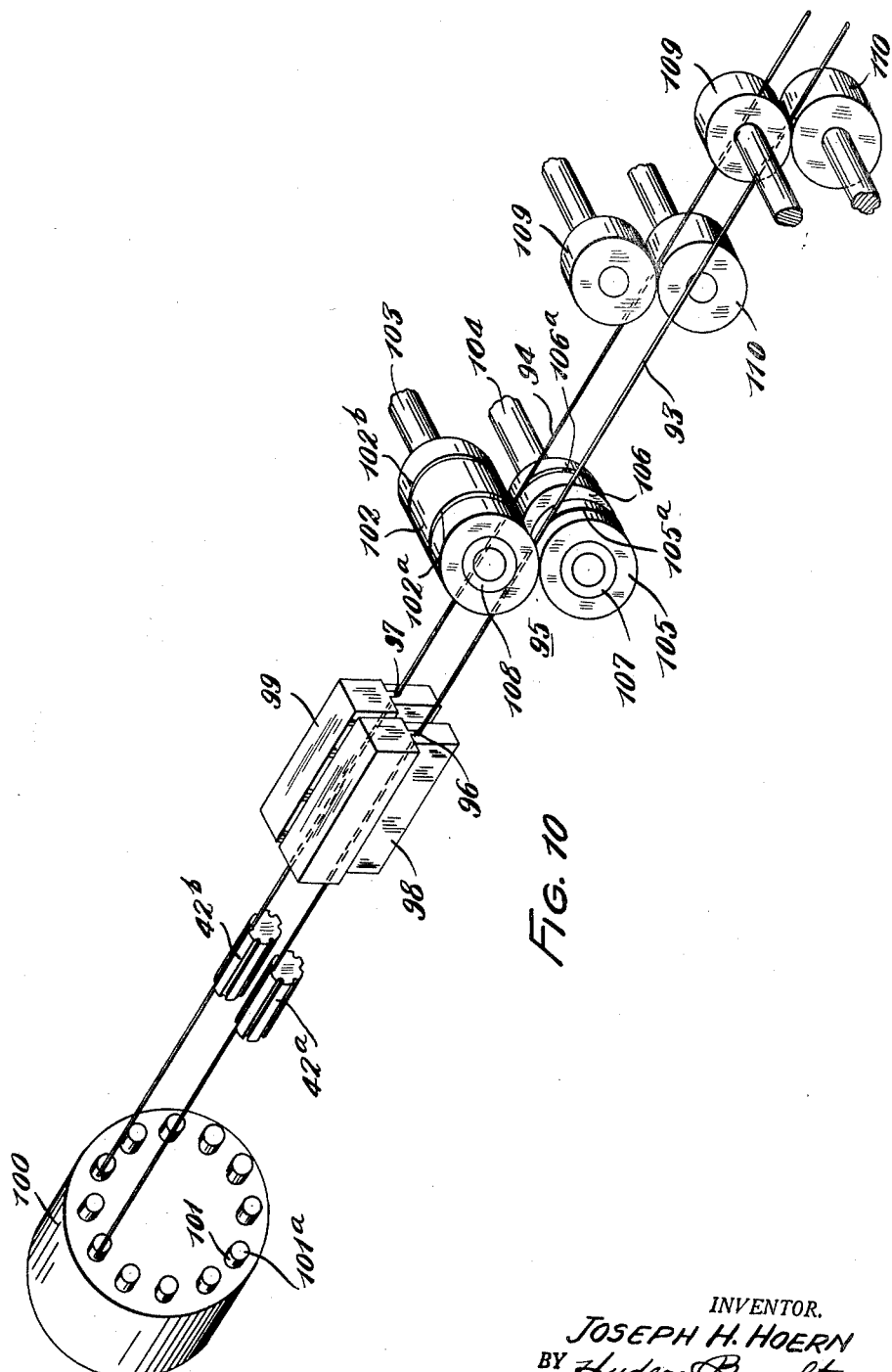

United States Patent Office 2,707,026
Patented Apr. 26, 1955

2,707,026
WIRE CUTTING MACHINES

Joseph H. Hoern, Saginaw, Mich., assignor, by mesne assignments, to Joseph Gogan, Cleveland, Ohio Application July 17, 1951, Serial No. 237,246

15 Claims. (Cl. 164—61)

This invention relates to the production of cut wire shot for use in shot blasting operations and the like and, more particularly, to an improved wire cutting machine.

An object of the present invention is to provide a novel wire cutting machine by which such cut wire shot can be produced rapidly and economically and with minimum attention on the part of an operator.

Another object is to provide a wire cutting machine having cutting dies of a novel form which will operate satisfactorily for a prolonged period without resharpening, and in which resharpening of the cutting dies can be quickly and easily accomplished when this becomes necessary.

A further object is to provide a wire cutting machine of this character in which a cutter having an end face slidable on the surface of an adjacent cut-off die is repeatedly movable in shearing relation across a feed passage of the cut-off die for severing successive segments from the end of a wire being fed through such feed passage.

Still another object is to provide a wire cutting machine of the character just mentioned in which the cutter has a flat end face with a peripheral cutting edge extending therearound, and in which the cutter is rotatable about its own axis for presenting different portions of the cutting edge to the wire to be cut for maximum cutting service before resharpening becomes necessary.

Yet another object is to provide such an improved wire cutting machine in which the path of movement of the cutter and the feed passage of the cut-off die are in such cooperating relation that a reaction force of the cutting operation will be effective on the cutter to automatically cause the desired rotation thereof.

As an additional object this invention provides a novel wire cutting machine of this character in which the cut-off die has a group of feed passages therein affording maximum cutting service before resharpening of the cut-off die becomes necessary, and in which the cut-off die is movable for locating such passages individually in a working position for cooperation of the movable cutter therewith.

It is also an object of this invention to provide a wire cutting machine in which a plurality of cutters, disposed in an annular group and having their end faces slidable on the shearing surface of the cut-off die, are employed and are slidably and rotatably received in openings of a rotatable carrier which is preferably also a flywheel.

As a further object this invention provides an improved wire cutting machine of the character already mentioned, having novel control means for automatically stopping the machine in response to a function or condition of the wire being fed, such as an interruption or decrease in the established rate of feed or a kinked condition of the wire.

The invention can be further briefly summarized as consisting in certain novel combinations and arrangements of parts hereinafter described and particularly set out in the claims hereof.

In the accompanying sheets of drawings,

Fig. 4 is a fragmentary transverse vertical section taken as indicated by section line 4—4 of Fig. 2 and looking toward the cutting head and showing the cut-off die and the releasable retaining bar thereof;

Fig. 5 is a partial longitudinal section taken through the cutting head of the machine, substantially on a horizontal plane as indicated by section line 5—5 of Fig. 4;

Fig. 8 is a partial transverse vertical section taken through the machine as indicated by section line 8—8 of Fig. 2 and further illustrating the actuating means for the automatic stopping switch shown in Fig. 3;

Figure 1:
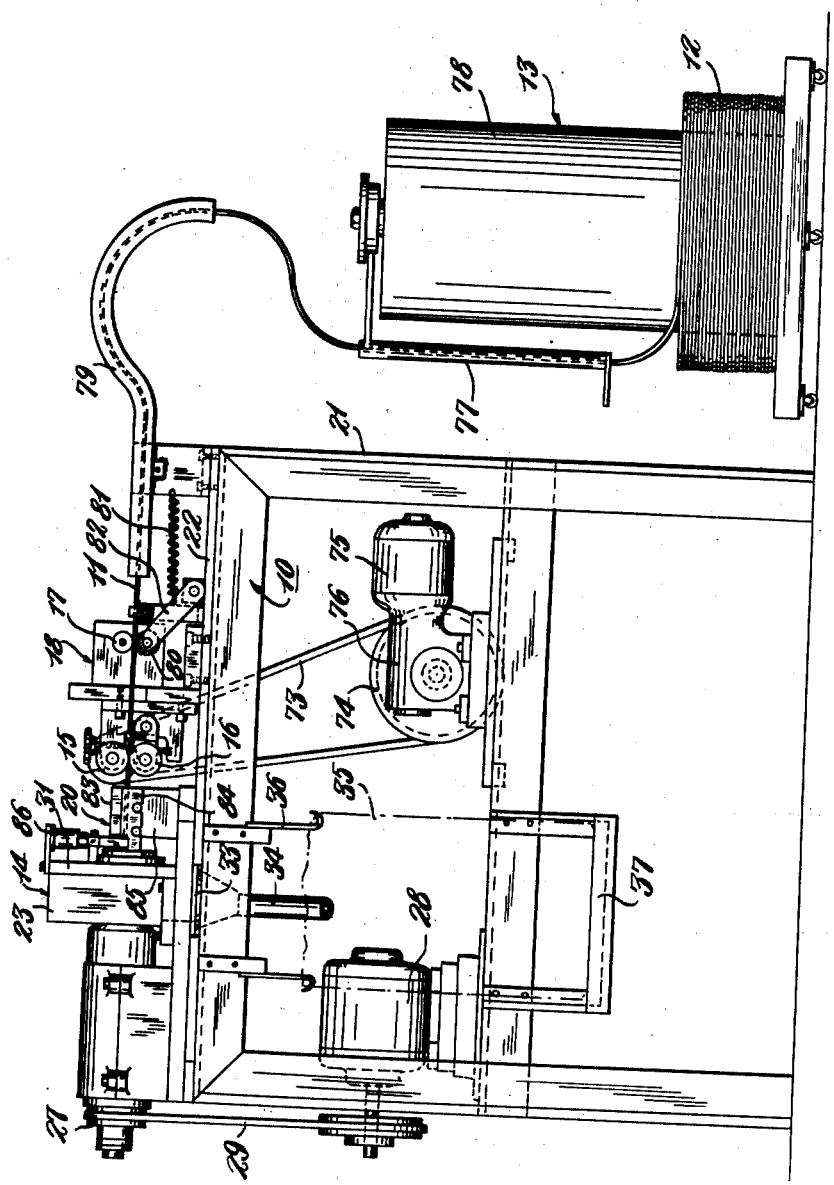
Fig. 1 is a front elevation showing a wire cutting machine embodying the present invention.
Figure 2:
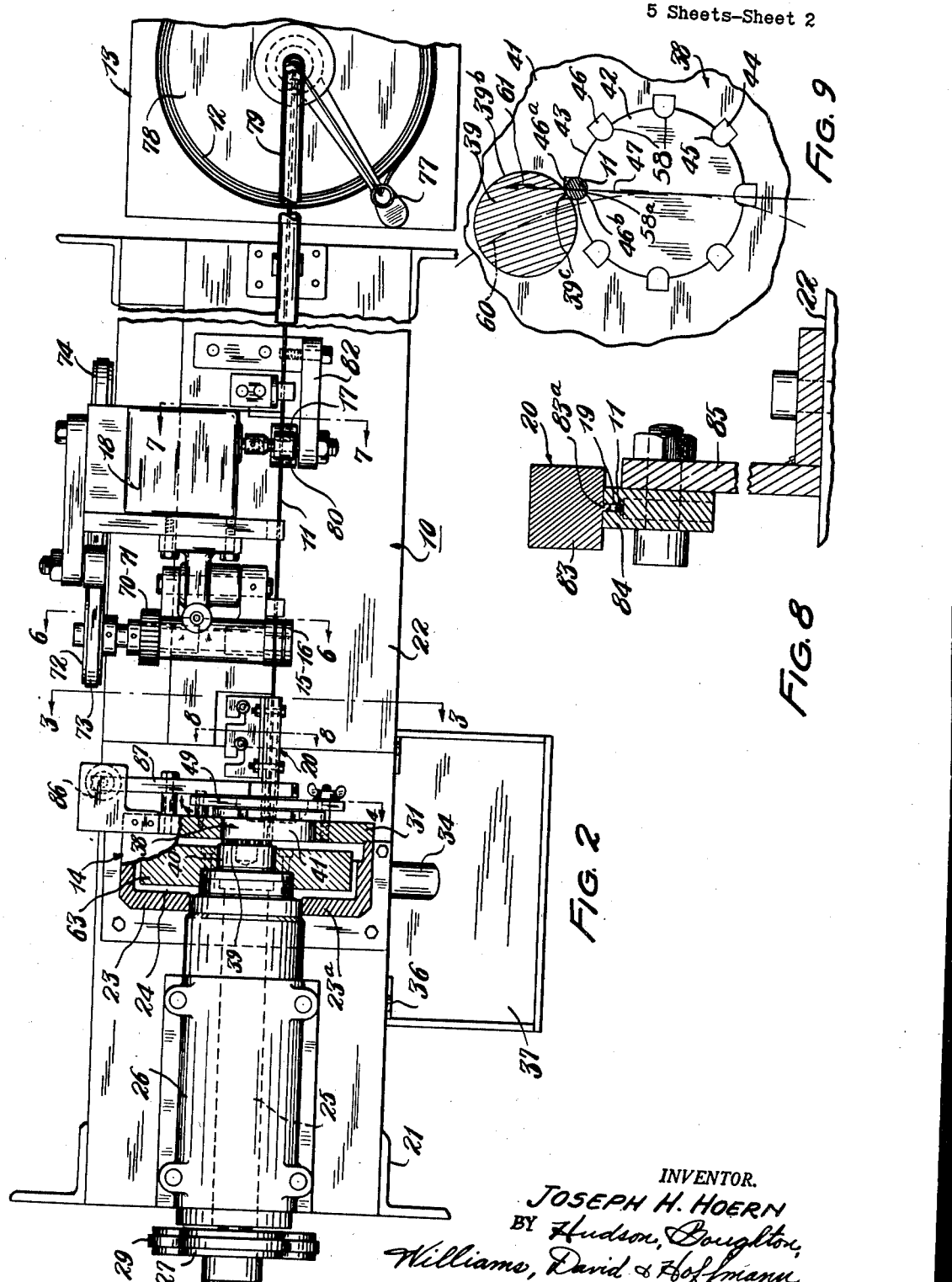
Fig. 2 is a top plan view of the machine showing the same on a larger scale and with portions broken away.

Fig. 9 is a fragmentary transverse vertical section, somewhat diagrammatic in form and on an enlarged scale, taken substantially as indicated by section line 9—9 of Fig. 5 and further illustrating one of the cutting dies and the operation thereof; and Fig. 10 is a perspective view of a somewhat diagrammatic form showing a modified apparatus designed to perform a cutting operation simultaneously on a plurality of wires.

As one practical embodiment of the invention, Figs. 1 to 9 inclusive show a wire cutting machine 10 by which cut wire shot can be rapidly and economically produced by cutting short segments from the leading end of a wire 11 being fed from an available source of supply such as a coil 12 supported on a suitable carrier or dolly 13. The wire 11 can be a wire of any desired characteristics such as a hardened steel wire and the segments cut therefrom can be of any desired length, but usually are of a length approximately equal to the diameter of the wire.

The novel wire cutting machine 10 includes, as an important part thereof, a cutting head 14 embodying cooperating cutting dies which will be presently described. The cutting machine also includes a pair of cooperating feed rolls 15 and 16 by which the wire 11 is withdrawn from the coil 12 and fed to the cutting head 14.

In passing to the feed rolls 15 and 16, the wire 11 engages the driving roll 17 of a switch device 18 which is operable to automatically stop the machine in response to a decrease in speed or an interruption in the wire feeding movement and which is preferably in the form of a conventional centrifugal switch. In passing from the feed rolls 15 and 16 to the cutting head 14, the wire 11 traverses the guide channel 19 of another automatic control device 20 which is operable to stop the machine in response to another change in the wire being fed such as the occurrence of a kinked condition in the wire. The mechanism for driving the feed rolls 15 and 16, and the automatic stopping devices 18 and 20, will be further described hereinafter.

As shown in the drawings, the wire cutting machine 10 is provided with a suitable frame 21 having a top table portion 22 forming a substantially flat horizontal support on which the cutting head 14 and various other parts of the machine are mounted. The cutting head 14 comprises a housing 23 containing a cutting chamber 24, and a rotary spindle 25 mounted in a longitudinal bearing 26 and having one end thereof extending into the cutting chamber through the upright rear wall 23a of the housing. The other end of the spindle 25 projects from the bearing 26 and has a pulley 27 mounted thereon by which the spindle is adapted to be driven from an electric motor 28 through a suitable belt 29.

The upright front wall of the housing 23 is in the form of a cover 31 secured to the housing and having an opening 32 therein. The bottom wall of the housing is a transverse wall provided with a suitable delivery opening for the discharge of the shot from the cutting chamber 24. The discharge opening is preferably equipped with a funnel-like cover 33 which is suitably secured to the bottom wall of the housing and has a delivery spout 34 extending downwardly and forwardly therefrom for delivery of the shot into a container, such as a bag 35 which has its upper end suspended on suitable hooks 36 and its lower end supported by a shelf or bracket 37.

The cutting mechanism embodied in the cutting head 14 includes a cut-off die 38 mounted in the opening 32 of the front cover 31, and a group of cutters 39 mounted in a carrier 40 and movable thereby in shearing cooperation with the cut-off die. The cut-off die 38 is here shown as comprising a substantially circular die block 41 which is seated in and substantially closes the opening 32 of the front cover 31, and a die stem 42 mounted in a central opening or bore 43 of this die block. The internal surface 43ᵃ of the bore 43 is a generally smooth substantially cylindrical bore which is preferably provided with an annular group of circumferentially spaced slots 44 of a substantially quadrangular cross-sectional shape. The die stem 42 is mounted in the bore 43 as by a press-fit engagement therein and has an annular series of longitudinal spline grooves 45 formed in the external surface thereof and having an arcuately spaced relationship corresponding with the spacing of the internal slots 44 of the die block 41. The spline grooves 45 are of an arcuate cross-sectional shape corresponding with the radius of curvature of the wire 11 being supplied to the cutting head.

When the die stem 42 is mounted in the bore 43 of the die block 41, the slots 44 and the spline grooves 45 cooperate to form feed passages 46 extending axially through the cut-off die 38 and communicating with the cutting chamber 24. When the machine 10 is being used to operate on a single wire as shown in Figs. 1 to 9 inclusive, only one of the feed passages 46 is used at any one time and the feed passage thus used is preferably the upper passage 46ᵃ which is located substantially on the vertical axis 47 of the cut-off die 38. The remaining feed passages 46 constitute a group of reserve feed passages which can be brought to the effective position of the feed passage 46ᵃ when desired by rotative adjustment of the die block 41 in the opening 32.

The cut-off die 38 is removable from the opening 32 but is normally retained therein by a flat retaining bar 49 which extends across the outer face of the die block 41 and is detachably secured to the cover 31 by means of a screw 50 and by a stud 51 having a wing nut 52 thereon. The retaining bar 49 is provided with a central opening 53 through which the front central portion of the cut-off die 38 is exposed for feeding of the wire 11 thereto and is also provided with slots 54 and 55 which cooperate respectively with the screw 50 and the stud 51. From the construction and mounting just described for the retaining bar 49, it will be seen that this member can be readily removed from the cover 31 to permit withdrawal of the cut-off die 38 from the opening 32 merely by loosening the wing nut 52 and disengaging the slots 54 and 55 from the screw 50 and the stud 51.

The stud 51 preferably also forms a locating means for the cut-off die 38 for positioning the feed passage 46ᵃ in the above-mentioned desired location on the vertical axis 47. For cooperation with this stud, the rim of the die block 41 is provided with an annular group of notches 56 corresponding in number and circumferential spacing with the feed passages 46. Any one of the feed passages 46 can be located in the effective position by merely withdrawing the cut-off die 38 from the opening 32 and rotating the same through the necessary angular distance before reinserting this die in the opening. When the die 38 is thus reinserted in the opening, the selected feed passage 46ᵃ will be held in the effective position by the cooperation of the corresponding notch 56ᵃ of the die block 41 with the stud 51.

The inner face of the cut-off die 38 constitutes a shearing surface 57 with which the cutters 39 cooperate in a manner to be presently explained. The shearing surface 57 is preferably, though not necessarily, a flat shearing surface as shown in Fig. 5 and is formed in part by the inner face of the die block 41 and in part by the inner end face of the die stem 42. The die stem 42 is mounted in the die block 41 so that the inner end face of the stem will be exactly flush with the inner face of the die block 41. The shearing surface 57 thus formed will be a continuous flush surface on which the inner ends of the spline grooves 45 of the die stem 42 will define relatively sharp shearing edges 58.

The arcuate edge of the feed passage 46ᵃ which is in the effective position explained above, thus forms an arcuate shearing edge 58ᵃ at the inner end of this passage against which the wire 11 can be sheared. When the shearing edge 58ᵃ becomes dull, the cut-off die 38 can be shifted arcuately to bring the other shearing edges 58 to the effective position in succession. When all of the shearing edges 58 have become dull, the die stem 42 can be removed from the die block 41 and, by grinding the inner end face of this stem, a new set of sharp shearing edges 58 can be provided thereon. After such grinding of its inner end face, the die stem 42 is reassembled into the bore of the die block 41 and the shearing surface 57 on the inner face of the cut-off die 38 can then be polished to a smooth flush condition. Such grinding and polishing operations can be repeated from time to time whenever resharpening of the arcuate shearing edges 58 of the die stem 42 is needed.

The cutters 39 have end faces 39ᵃ which are slidable on and cooperate with the shearing surface 57 of the cut-off die 38 and, as shown in this instance, these end faces are flat end faces. These cutters are in the form of cylindrical pins which are disposed in cylindrical axial openings 58′ of the carrier 40. The cutters 39 are both axially slidable and rotatable in the openings 58′ and have their flat end faces 39ᵃ held against the shearing surface 57 of the cut-off die 38 by compression springs 59 which are disposed in the openings inwardly of the cutters.

The cutters 39 are provided in suitable number, in this instance 10 such cutters are shown, and are located in a circular group such that during rotation of the carrier 40 by the spindle 25 their axes will follow a path of movement represented by the circle 60. During such rotation of the carrier 40, the end faces 39ᵃ of the cutters will be moved in succession across the inner end of the feed passage 46ᵃ and, as each cutter moves across this passage, it will cooperate with the shearing edge 46ᵇ of the feed passage in shearing a segment or shot particle from the inner end of the wire 11.

The provision for rotation of the cutters 39 about their own axes in the openings 58′ of the carrier 40 constitutes an important feature of this invention because it results in a longer useful life for these cutters during the wire cutting operation performed by the machine 10. As will be seen from the showing in Fig. 9, each of the cutters 39 has a circumferential shearing edge 39ᵇ extending around the periphery of its end face 39ᵃ. During the shearing cooperation of the cutter 39 with the cut-off die 38, one portion only of the cutter comes into engagement with the wire 11 during the making of any one cut. This portion is the cutting edge portion designated 39ᶜ in Fig. 9. This effective cutting edge portion 39ᶜ is shown in the position where it is just starting the shearing action on the wire 11. The rotation of the cutter 39 in its mounting opening 58′ permits all portions of the peripheral cutting edge 39ᵇ to be successively brought to the effective position of the cutting edge portion 39ᶜ, and hence, the useful life of the cutters 39 will thereby be greatly prolonged before replacement or resharpening of the cutters is needed.

In obtaining this desired rotation of the cutters 39 in their mounting openings 58′, the cutters have a sufficiently loose fit in these openings to permit the cutters to float therein. This rotation of the cutters is also obtained by a reaction force which tends to rotate the cutters and which results from the shearing action of the cutters on the wire 11. This reaction force results from the fact that at the time the effective shearing edge portion 39ᶜ engages the wire 11, it occupies an eccentric position relative to the circular path of cutter travel 60. Thus, with reference to the showing in Fig. 9, it will be seen that the effective shearing edge portion 39ᶜ at the time of its engagement with the wire 11 is located at one side of the path 60, in this instance somewhat to the right of this path, and hence the reaction force produced by the shearing action will be a force tending to rotate the cutter 39 in a counter-clockwise direction as seen in Fig. 9 and represented by the directional arrow 61.

Whenever the peripheral cutting edges 39ᵇ of the cutters 39 become dull, the cutters can be removed from the carrier 40 and the end faces 39ᵃ can be quickly and easily resurfaced, as by a grinding operation on a so-called diamond wheel. Since the cutters 39 are in the form of plain cylindrical pins, such a resurfacing operation on the end faces 39ᵃ of the cutters can be performed repeatedly as needed and the cutters will perform thereafter with the same efficient shearing function because the springs 59 will project the cutters from the openings 58' for the necessary distance to press the end faces 39a into shearing engagement with the cut-off die 38. In a cutting machine of this character the cutters 39 and the die stem 42 are made of a hard material, preferably of tungsten-carbide, and the novel manner in which these die members are located and mounted in the machine permits a very economical use of these die members and they will need to be replaced only when the wear occurring on the effective ends thereof renders them too short for further satisfactory service.

In order to carry out the successive shearing operations performed on the wire 11 by the cutters 39 with minimum jar or shock, the carrier 40 is preferably connected with or formed as a part of a fly wheel 63. This fly wheel is located in the cutting chamber 24 and connected with the inner end of the spindle 25 and results in a smooth and substantially vibrationless operation of the machine. By thus decreasing the shock effect of the shearing operations performed by the cutters, the tendency for breakage of the cutters or of the die stem 42 is greatly lessened.

Figure 6:
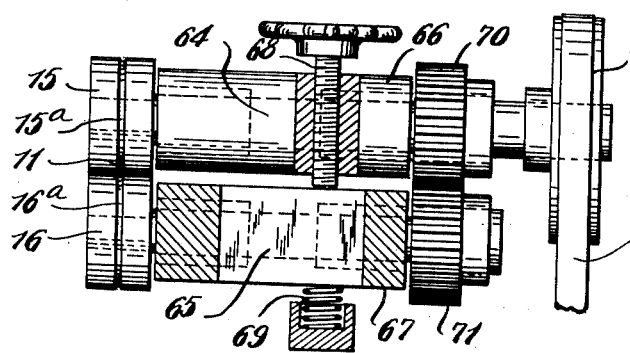
Fig. 6 is a partial transverse vertical section taken through the machine as indicated by section line 6—6 of Fig. 2 and showing the wire feeding rolls.
Figure 7:
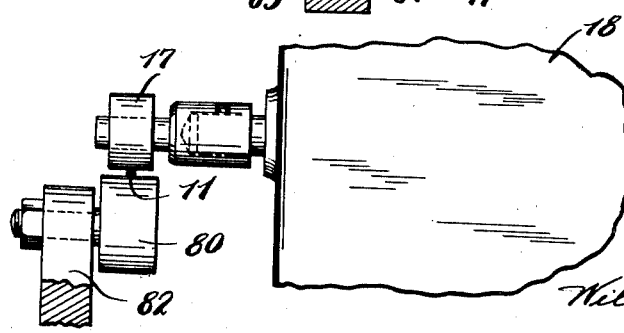
Fig. 7 is a partial transverse vertical section taken through the machine as indicated by section line 7—7 of Fig. 2 and showing the driving means for another automatic stopping switch.

Reverting now to the feed rolls 15 and 16, it will be seen from Fig. 6 that these rolls comprise plain cylindrical rolls, preferably metal rolls, having cooperating peripheral grooves 15a and 16a therein which receive and grip the wire 11. The rolls 15 and 16 are carried by upper and lower shafts 64 and 65 which are journaled respectively in a pair of fixed and movable brackets 66 and 67. The movable bracket 67 is adapted to be shifted relative to the fixed bracket 66 by the action of an adjusting screw 68 and a compression spring 69 to vary the effective spacing between the feed rolls 15 and 16.

Both feed rolls 15 and 16 are driven to advance the wire 11 and for this purpose the shafts 64 and 65 are connected by gears 70 and 71 mounted thereon. One of the shafts, in this instance the upper shaft 64, has a pulley 72 thereon which is adapted to be driven by a belt 73 extending therearound. The belt 73 also engages a driving pulley 74 which is driven by an electric motor 75 through a suitable reduction gearing 76. By proper selection of the diameters for the pulleys 72 and 74 the feed rolls 15 and 16 will be driven at a speed in relation to the travel of the cutters 39, such that the wire 11 will be advanced continuously to the cutting chamber 24 at a rate which will result in shot of the desired length being cut from the wire.

To minimize kinking of the wire being withdrawn from the coil 12 by the feed rolls 15 and 16, the wire is preferably led through a guide device 77 which is mounted on the dolly 13 so as to be capable of revolving about the mandrel 78. The wire is also led through a fixed guide tube 79 which is mounted on the frame 21 in a position to receive the wire from the guide device 77 and direct it to the feed rolls.

In traveling from the guide tube 79 to the feed rolls 15 and 16, the wire 11 passes between the driving roller 17 of the centrifugal switch 18 and a pressure roller 80 which holds the wire against this driving roller in response to the pulling force of a tension spring 81 acting on a pivoted lever 82 carrying the pressure roller. During the continuous movement of the wire 11 to the cutting head 14 by the feed rolls 15 and 16, the roller 17 of the centrifugal switch 18 will be driven by the wire and the switch will be maintained in its closed condition. Whenever this advance movement of the wire is interrupted or slowed down, the driving of the roller 17 will be correspondingly affected and will result in an automatic tripping of the centrifugal switch 18. The tripping of this centrifugal switch is effective through suitable circuit means to cause deenergization of the driving motors 28 and 75 to thereby disable and stop the machine 10 until the abnormal condition is attended to by the operator. Such a tripping of the centrifugal switch 18 will result from the wire coil 12 being used up or from interruption to the forward movement of the wire such as might be produced by a kinking of the wire at one of the guide tubes 77 or 79.

The control device 20 which is located between the feed rolls and the cutting head 14 comprises a pair of upper and lower guide members 83 and 84 which are elongated in the direction of travel of the wire and which cooperate to define the guide groove 19 through which the wire 11 passes. The lower guide member 84 is a fixed guide member which is suitably supported by a bracket 85 and has the guide groove 19 formed in the upper surface thereof. The upper guide member 83 normally rests on the lower guide member 84 and has a longitudinal tongue 83a thereon which engages in and closes the guide groove 19. The guide passage 19 is of such size as to normally permit a free feeding movement of the wire 11 therethrough, but when a kink in the wire enters the passage 19 or develops therein, it will engage the tongue 83a and lift the upper guide member 83. Such lifting of the upper guide member 83 will also be produced by a buckling of the wire 11 in the event that a kink should develop in or ahead of the guide passage 46a of the cut-off die 38.

The control mechanism 20 also includes a sensitive electric switch 86 such as a microswitch having a movable actuating stem 86a projecting therefrom, and a lever 87 rockable on a pivot 88. One end of the lever 87 carries a weight 89 and has a depending portion provided with a rounded contact surface 90 which seats on the upper guide member 83. The other end of the lever 87 carries an adjustable screw 91 which is normally in engagement with the switch stem 86a.

Figure 3:
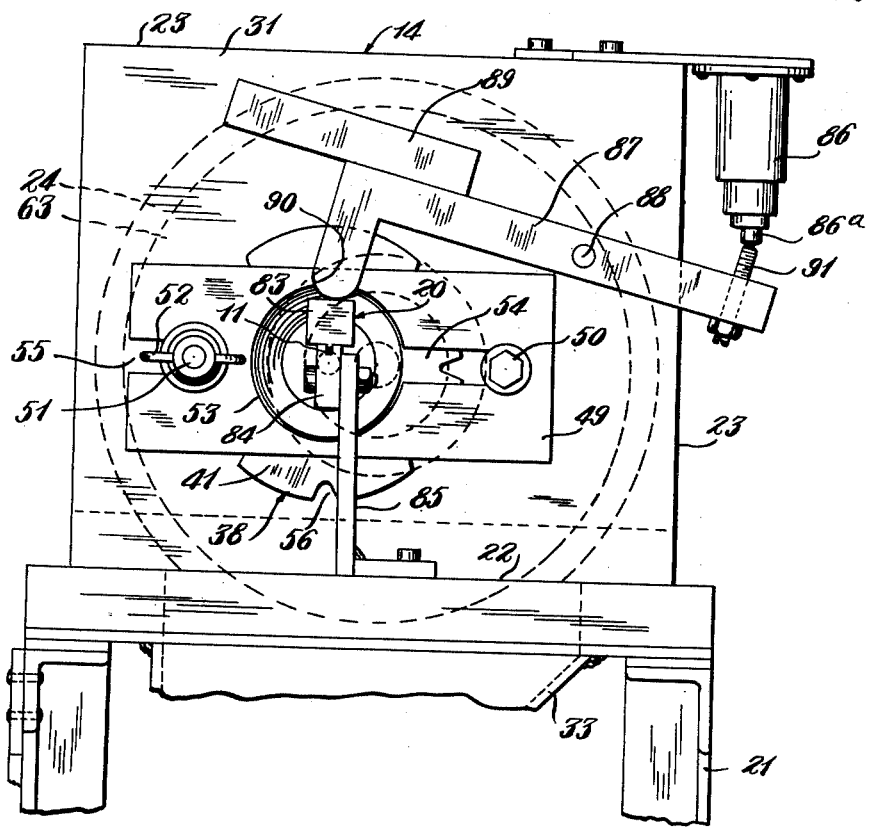
Fig. 3 is a partial transverse vertical section taken substantially as indicated by section line 3—3 of Fig. 2 and showing the cutting head of the machine and also showing the actuating means for an automatic stopping switch.

The normal position of the lever 87 and of the guide member 83 corresponds with a satisfactory running condition of the machine and is the position shown in Figs. 3 and 8 in which the upper guide member 83 is seated on the lower guide member 84 and the screw 91 engages the switch stem 86a and holds the switch 86 in a closed position. A kinked condition occurring in the wire 11 causes the upper guide member 83 to be lifted as mentioned above, thereby swinging the lever 87 in a direction to move the screw 91 downwardly and permit opening of the switch 86. Suitable circuit means controlled by the switch 86 causes deenergization of the motors 28 and 75 in response to the opening of the switch to thereby disable and stop the machine 10 until the abnormal condition is attended to by the operator.

In Fig. 10 of the drawings, a modified form of this improved wire cutting machine is shown. The modified machine is designed for the feeding of a plurality of wires, in this instance two wires 93 and 94, simultaneously to the cutting head. The wires 93 and 94 are advanced to the cutting head by a feed roll device 95 and pass through the guide grooves 96 and 97 of a pair of automatic stopping devices 98 and 99 which are similar to the automatic stopping device 20 described above. The wires 93 and 94 are supplied to a cut-off die which is similar to the cut-off die 38 described above but which embodies two of the splined die stems 42a and 42b. The modified wire cutting machine also includes a carrier 100 similar to the carrier 40 described above and an annular group of cutters 101 actuated thereby. The cutters 101 have flat end faces 101a which slidably cooperate with the inner ends of the die stems 42a and 42b in shearing segments from the ends of the wires 93 and 94 in succession.

The feed roll mechanism of this modified wire cutting machine includes a single or common driven roll 102 connected with a drive shaft 103 and having peripheral grooves 102a and 102b in which the wires 93 and 94 engage. The feed roll mechanism 95 also includes a second shaft 104 and a pair of individual rolls 105 and 106 serving the individual wires 93 and 94 and having peripheral grooves 105a and 106a in which the wires 93 and 94 also engage. The individual rolls 105 and 106 constitute pressure rolls for holding the wires 93 and 94 against the driven roll 102. By having all the wires fed by a single driven feed roll it will be seen that the wires will all be advanced simultaneously at the same rate of speed.

The individual rolls 105 and 106 are yieldingly mounted on the shaft 104 as by means of bearing means which includes yieldable bushings 107 formed of soft rubber or other suitable material and which permit limited shifting of the individual rolls relative to the shaft 104 during their cooperation with the common roll 102. The driven roll 102 is here shown as also being yieldably mounted on the drive shaft 103 by having a yieldable bushing 108 formed of soft rubber or other suitable material interposed therebetween. If desired, however, the driven roll 102 can be mounted in fixed relation on the drive shaft 103, in which case the bushing 108 is omitted.

In passing to the feed roll mechanism 95, the wires 93 and 94 each engage and drive an actuating roll 109 of a centrifugal switch, such as the centrifugal switch 18 referred to above, and which constitutes a part of an automatic stopping device. The wires 93 and 94 are each also engaged by a pressure roll 110 which serves to press the wire against the actuating roll 109 of the centrifugal switch.

From the accompanying drawings and the foregoing detailed description it will now be readily understood that this invention provides an improved wire cutting machine by which short segments can be rapidly severed from the leading end of a wire being fed for the production of cut wire shot for use in shot blasting operations and the like. It will now also be understood that this improved wire cutting machine embodies cutting dies which are so constructed and mounted as to permit the same to be quickly and easily resharpened or replaced without requiring the machine to be stopped for more than a relatively short period of time. Likewise, it will now be understood that the cutters have their end faces in sliding cooperation with the shearing surface of a cut-off die such that repeated movement of the cutters across the feed passage of the cut-off die results in the desired segments being cut in rapid succession from the leading end of the wire being fed. Additionally, it will be understood that the provision herein made for rotation of the cutters about their axes results in different portions of the peripheral shearing edge of the cutters being successively brought into effective position such that the full peripheral edge will be used and the cutters will have a relatively long useful life before they require resharpening. It will now also be understood that the improved wire cutting machine embodies automatic stopping devices which are responsive to changes in the speed or condition of the wire being fed and will result in automatic stopping of the machine whenever the supply of wire is used up, or whenever the feeding movement of the wire is slowed or interrupted, or when kinking or buckling occurs in the wire. Additionally, it will now also be understood that this invention provides a modified form of the improved wire cutting machine in which a plurality of wires can be fed and cut simultaneously.

Although the improved wire cutting machine of this invention has been illustrated and described herein to a somewhat detailed extent, it will be understood, of course, that the invention is not to be regarded as being limited correspondingly in scope but includes all changes and modifications coming within the terms of the claims hereof.

Having thus described my invention, I claim:

1. In a wire cutting machine, a pair of adjacent members one being a carrier movable about a fixed axis and having an axial opening therein in eccentric relation to said fixed axis and the other member having a shearing surface presented toward said carrier and a feed passage adapted to accommodate a wire to be cut and opening through said shearing surface at a point substantially opposite the path of movement of said opening, a cutter in the form of a pin disposed in said opening and having an end face slidable on said shearing surface, and driving means operable to actuate said carrier about said fixed axis for causing repeated movement of the end face of said cutter in shearing relation across said feed passage for shearing successive segments from said wire.

2. In a wire cutting machine, a cut-off die having a substantially flat surface and a feed passage extending therethrough substantially normal to the plane of said surface and adapted to accommodate a wire to be cut, a carrier adjacent said cut-off die, a cutter in the form of a pin supported by said carrier and having a substantially flat end face slidable on said flat surface in shearing relation to said cut-off die, and means mounting said carrier for repeated movement of the flat end face of said cutter across said passage for shearing successive segments from the projecting end of said wire.

3. In a wire cutting machine, a pair of adjacent members one being a carrier movable about a fixed axis and having an axial opening therein in eccentric relation to said fixed axis and the other member having a shearing surface presented toward said carrier and a feed passage adapted to accommodate a wire to be cut and opening through said shearing surface at a point substantially opposite the path of movement of said opening, a cutter disposed in said opening and having an end face slidable on said shearing surface, and driving means operable to actuate said carrier about said fixed axis for causing repeated movement of the end face of said cutter in shearing relation across said feed passage for shearing successive segments from said wire, the end face of said cutter having a peripheral shearing edge extending therearound and said cutter being rotatable in said opening for presentation of different portions of said shearing edge to the wire to be cut.

4. In a wire cutting machine, a pair of adjacent members one being a carrier movable about a fixed axis and having an axial opening therein in eccentric relation to said fixed axis and the other member having a shearing surface presented toward said carrier and a feed passage adapted to accommodate a wire to be cut and opening through said shearing surface at a point substantially opposite the path of movement of the axis of said opening, a cutter disposed in said opening and having an end face slidable on said shearing surface, and driving means operable to actuate said carrier about said fixed axis for causing repeated movement of the end face of said cutter in shearing relation across said feed passage for shearing successive segments from said wire, the end face of said cutter having a peripheral shearing edge extending therearound and said cutter being rotatable in said opening for presentation of different portions of said shearing edge to the wire to be cut, the location of said feed passage relative to the path of movement of said opening being such that the peripheral shearing edge of said cutter engages the wire eccentrically of said path of movement for utilizing the reaction force of the cutting operation to rotate the cutter in said opening.

5. In a wire cutting machine, a pair of adjacent members one being a rotatable carrier having axial openings therein disposed in an annular row about the rotation axis of the carrier and the other member having an adjacent substantially flat surface thereon and a feed passage adapted to accommodate a wire to be cut and opening through said flat surface at a point substantially opposite said row of openings, driving means connected with said carrier for rotating the same, cutters mounted in the openings of said carrier and having end faces slidable on said flat surface for movement in succession in shearing relation across said feed passage, said cutters being rotatable and axially movable in said openings, and springs in said openings and effective on the cutters for pressing said end faces against said flat surface.

6. In a wire cutting machine, a pair of adjacent members one being a rotatable carrier having axial openings therein disposed in an annular row about the rotation axis of the carrier and the other member having an adjacent substantially flat surface thereon and a feed passage adapted to accommodate a wire to be cut and opening through said flat surface at a point substantially opposite said row of openings, driving means connected with said carrier for rotating the same, and cutters mounted in the openings of said carrier and having end faces slidable on said flat surface for movement in succession in shearing relation across said feed passage, the end faces of said cutters having a peripheral shearing edge extending therearound and said cutters being rotatable in said openings for presentation of different portions of such shearing edge to the wire to be cut.

7. In a wire cutting machine, a pair of adjacent members one being a rotatable carrier having axial openings therein disposed in an annular row about the rotation axis of the carrier and the other member having an adjacent substantially flat surface thereon and a feed passage adapted to accommodate a wire to be cut and opening through said flat surface at a point substantially opposite said row of openings, driving means connected with said carrier for rotating the same, and cutters mounted in the openings of said carrier and having end faces slidable on said flat surface for movement in succession in shearing relation across said feed passage, the end faces of said cutters having a peripheral shearing edge extending therearound and said cutters being rotatable in said openings for presentation of different portions of such shearing edge to the wire to be cut, the location of said feed passage relative to the path of travel of the axes of said openings being such that the peripheral shearing edges of the cutters are engaged by the wire eccentrically of said path for utilizing the reaction force of the cutting operation to rotate the cutters in said openings.

8. In a wire cutting machine, a cut-off die having a substantially flat surface and a feed passage extending therethrough substantially normal to the plane of said surface and adapted to accommodate a wire to be cut, a carrier adjacent said cut-off die and having an opening extending thereinto in substantially parallel relation to the axis of said feed passage, a cutter in the form of a substantially cylindrical pin projecting from the opening of said carrier and having a substantially flat end face slidable on said flat surface in shearing relation to said cut-off die, and means mounting said carrier for repeated movement of the flat end face of said cutter across said passage for shearing successive segments from the projecting end of said wire.

9. In a wire cutting machine, a cut-off die having a substantially flat surface and a feed passage extending therethrough substantially normal to the plane of said surface and adapted to accommodate a wire to be cut, a carrier adjacent said cut-off die and having an opening extending thereinto in substantially parallel relation to the axis of said feed passage, a cutter in the form of a substantially cylindrical pin projecting from the opening of said carrier and having a substantially flat end face slidable on said flat surface in shearing relation to said cut-off die, means mounting said carrier for repeated movement of the flat end face of said cutter across said passage for shearing successive segments from the projecting end of said wire, and spring means effective on said cutter for holding said end face against said surface.

10. In a wire cutting machine, a cut-off die having a substantially flat surface and a feed passage extending therethrough substantially normal to the plane of said surface and adapted to accommodate a wire to be cut, a carrier adjacent said cut-off die, bearing means supporting said carrier for rotation about an axis extending substantially parallel to said feed passage, said carrier having an annular group of openings extending thereinto in substantially parallel relation to said feed passage, said feed passage being offset from the rotation axis of said carrier and said openings being located substantially on a circumference which passes through the axis of said feed passage, and a group of cutters in the form of pins projecting from said openings and having substantially flat end faces slidable on said surface in shearing relation to said cut-off die, said cutters being movable across said feed passage in succession by said carrier for severing successive segments from the projecting end of said wire.

11. In a wire cutting machine, a cut-off die having a substantially flat surface and a feed passage extending therethrough substantially normal to the plane of said surface and adapted to accommodate a wire to be cut, a carrier adjacent said cut-off die, bearing means supporting said carrier for rotation about an axis extending substantially parallel to said feed passage, said carrier having an annular group of openings extending thereinto in substantially parallel relation to said feed passage, said feed passage being offset from the rotation axis of said carrier and said openings being located substantially on a circumference which passes through the axis of said feed passage, a group of cutters in the form of pins projecting from said openings and having substantially flat end faces slidable on said surface in shearing relation to said cut-off die, and springs in said openings effective on said cutters and holding said flat end faces in such sliding engagement with said surface, said cutters being movable across said feed passage in succession by said carrier for severing successive segments from the leading end of said wire.

12. In a wire cutting machine, a pair of adjacent members one being a rotatable carrier having axial openings therein disposed in an annular row about the rotation axis of the carrier and the other member having an adjacent substantially flat surface thereon and a feed passage adapted to accommodate a wire to be cut and opening through said flat surface at a point substantially opposite said row of openings, driving means connected with said carrier for rotating the same, and cutters mounted in the openings of said carrier and having end faces slidable on said flat surface for movement in succession in shearing relation across said feed passage in which said carrier is a flywheel.

13. In a wire cutting machine, a pair of adjacent members one being a rotatable carrier having axial openings therein disposed in an annular row about the rotation axis of the carrier and the other member being a cut-off member having a substantially flat shearing surface presented toward said carrier and a plurality of feed passages opening through said surface, said feed passages being of a size to accommodate a wire to be cut and being in an annular group disposed about a common axis offset from said rotation axis, means supporting said cut-off member for movement about said common axis for locating one of said feed passages substantially opposite the path of movement of said openings, driving means operable to rotate said carrier, and cutters disposed in said openings and having end faces slidable on said flat surface for movement in succession in shearing relation across said one feed passage in which said cut-off member comprises a body having a bore extending therethrough on said common axis, and an externally splined stem mounted in said bore and having an end face substantially flush with said flat shearing surface, the spline grooves of said stem cooperating with portions of the internal surface of said bore in defining said feed passages.

14. In a wire cutting machine, a housing having a cutting chamber therein, a spindle journaled in said housing and having a head rotatable in said chamber, a cut-off member mounted on said housing and presenting a shearing surface toward said head interiorly of said chamber, said cut-off member having a feed passage adapted to accommodate a wire to be cut, said feed passage communicating with said chamber and opening through said shearing surface in substantially normal relation thereto, said head having an annular group of axial openings therein and disposed around the axis of rotation of said spindle at a radius from said axis such that the path of movement of said openings lies substantially opposite said feed passage, and cutters in the forms of pins slidably and rotatably received in said openings and having end faces slidable on said shearing surface and movable in succession across said feed passage for shearing segments from the end of said wire.

15. In a wire cutting machine, a housing having a cutting chamber therein, a spindle journaled in said housing and having a head rotatable in said chamber, a cut-off member mounted on said housing and presenting a shearing surface toward said head interiorly of said chamber, said cut-off member including a die stem having external axial grooves defining a group of feed passages of a size to accommodate wire to be cut and communicating with said chamber and opening through said shearing surface in substantially normal relation thereto, said head having an annular group of axial openings therein and disposed around the axis of rotation of said spindle at a radius from said axis such that the path of movement of said openings lies substantially opposite said group of feed passages, and cutters in the form of pins slidably and rotatably received in said openings and having end faces slidable on said shearing surface and movable in succession across certain of said feed passages for shearing end segments from said wire.

References Cited in the file of this patent
UNITED STATES PATENTS

| | | |
|---|---|---|
| 438,712 | Painter | Oct. 21, 1890 |
| 548,596 | Ryan | Oct. 22, 1895 |
| 608,471 | Miller | Aug. 2, 1898 |
| 1,951,841 | Roberts | Mar. 20, 1934 |
| 2,107,926 | Amussen et al. | Feb. 8, 1938 |